United States Patent
Einhaus

(10) Patent No.: US 7,104,276 B2
(45) Date of Patent: Sep. 12, 2006

(54) VALVE WITH REVERSIBLE VALVE SEAT FOR HIGH-PRESSURE PUMP (HP)

(75) Inventor: Rolf Einhaus, Menden (DE)

(73) Assignee: Udhe High Pressure Technologies GmbH, Hage (DE)

( * ) Notice: Subject to any disclaimer, the term of this patent is extended or adjusted under 35 U.S.C. 154(b) by 0 days.

(21) Appl. No.: 10/900,003

(22) Filed: Jul. 27, 2004

(65) Prior Publication Data
US 2005/0115614 A1 Jun. 2, 2005

(30) Foreign Application Priority Data
Jul. 28, 2003 (DE) .......................... 203 11 689 U

(51) Int. Cl.
*F16K 1/14* (2006.01)

(52) U.S. Cl. .................... 137/512; 137/515.3; 251/368

(58) Field of Classification Search ................ 137/512, 137/515.3, 528
See application file for complete search history.

(56) References Cited

U.S. PATENT DOCUMENTS 4,026,322 A * 5/1977 Thomas ...................... 137/512
4,862,911 A * 9/1989 Yie ........................... 137/454.4
5,406,978 A   4/1995 Smolong
5,782,269 A * 7/1998 Seaney et al. ......... 137/630.22

FOREIGN PATENT DOCUMENTS

| DE | 2 259 549 A | 6/1974 |
|---|---|---|
| DE | 27 21 390 A1 | 11/1978 |
| DE | 296 04 196 U1 | 5/1997 |
| DE | 197 47 636 A1 | 5/1999 |
| EP | 0 408 177 A1 | 1/1991 |

* cited by examiner

*Primary Examiner*—J. Casimer Jacyna
(74) *Attorney, Agent, or Firm*—Marshall & Melhorn, LLC

(57) ABSTRACT

High-pressure valve for high-pressure pump, which has a valve body with inlet and outlet, the cylinder chamber of the pump piston rod being connected to the said valve body. The inlet communicates with the cylinder chamber via a bore which houses a first valve seat with a valve ball. Moreover, the cylinder chamber is connected via a further bore with the outlet, said bore housing a valve seat with its valve ball. This device is characterised in that each valve seat with its valve ball is designed as ball check valve and thus forms an assembly. These ball check valves are removable from the valve body, the link between valve and valve body preferably being designed as single or multiple bolting. An ideal embodiment of the invention provides for ball check valves with external male threading and for a female threading in the recess accommodating the check valves.

9 Claims, 2 Drawing Sheets

VALVE WITH REVERSIBLE VALVE SEAT FOR HIGH-PRESSURE PUMP (HP)

Figure 1:
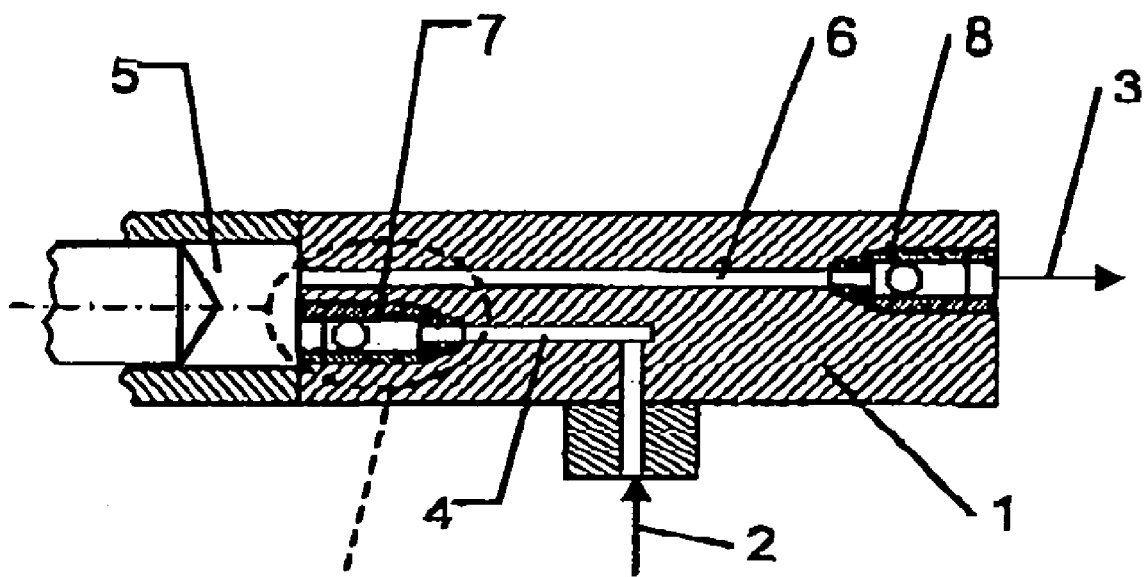

The invention related to a high-pressure valve for pulsating fluid streams, the valve seals mounted in the valve body being designed as ball check valves that are removable from the valve body.

HP ball valves rated for 5000 up to >14000 bar and intended for pulsating streams are subject to high wear and tear. The ball arranged in the line oscillates at high velocity between the valve seat, which closes the line, and some type of mechanical stop placed on the opposite side, said stop being a lock pin acting on the ball or forming a locking device. It is standard practice to design components subject to heavy duty wear in such a manner that they are easy to replace.

DE 197 47 636 describes a valve body that has at least two internal ball check valves, one on the free end of the cylinder of an HP pump and one on the other end in a yoke designed to accommodate a valve. The said yoke is linked to the high-pressure pump by means of external bolts so that the valve body can be easily removed and replaced. The invention described in DE 197 47 636 involves the disadvantage that the complete valve body must be replaced instead of the internal ball check valve deteriorated due to wear.

DE 37 21 390 describes an HP valve in which the motion of the ball is limited by a sleeve with central bore on the one side and by a push rod on the other. The type of invention published in said document provides for a ring of wear-resistant material used for the wall section that accommodates and guides the ball and is consequently subject to wear. The said ball shuts off the line when being moved to the pointed end of the central bore in the sleeve. The fluid stream flows in an axial manner through the bore into the valve body and leaves it via an annular channel and a bore, thereby performing a radial flow.

A clear disadvantage of this valve design is the fact that it consists of several components, i.e. sleeve, ring, valve housing, valve body. The axial bore of the valve housing must be manufactured by an ultra-precision method in conjunction with the external surface of the ring and its axial bore as well as the external surface of the sleeve and its axial bore, so that the oscillating ball is placed very precisely upon the bore of the sleeve. This criterion imposes stringent manufacturing requirements. A further critical aspect of the DE 37 21 390 design is the multiple reversal of the fluid stream in the valve body because pressures in excess of 14000 bar involve the risk that the basic material deteriorates as a result of the fluid stream impact.

Hence, the aim of the invention is to design a high-pressure valve that permits components subject to a high wear to be removed individually and with a minimum effort. Moreover, the said components must satisfy the requirement of material and manufacturing cost-efficiency.

The aim of the invention is achieved by means of a high-pressure valve that satisfies the criteria stated in the paragraphs below. An enhanced design of the device is described in various sub-claims.

The invention provides for a solution characterised in that the HP valve intended for a high-pressure pump has a valve body with an inlet and an outlet. The valve body is connected to the cylinder chamber of a pump piston rod in such a manner that the inlet is connected via a bore with said chamber. The bore houses a first valve seat and a ball and the other bore communicating with said chamber is also provided with a valve seat and a valve ball. This device is characterised in that each valve seat and its valve ball are designed as ball check valve and constitute an assembly. The said ball check valves are removable from the valve body, using preferably one or several bolts to link them to the valve body. An ideal embodiment of the invention provides for a male threading of the ball check valve and for female threading in the recess accommodating the check valves.

The valve seats are a separate mechanical and rotation-symmetric unit involving the major advantage that the adjustment process of the axial bores, which accommodate the valve ball, and of the small through-bore, the edge of which is designed to support the ball, can precisely be effected in a single operation so that there is no need for a sophisticated adaptation to make the components properly match the assembly.

The split-up of the mechanical design covers ont only the components and areas subject to major wear but also the sections with the most stringent surface quality requirements. The mechanical split-up of this component which must satisfy very high quality and material standards permits high cost-efficiency of manufacture.

The valve body and ball check valves are arranged in such a manner that motions of the HP pump plunger merely result in fluid-dynamic forces that make the valve ball change its position from Open to Close or vice versa.

A further advantageous embodiment of the invention provides for check valves with valve seats that consist of a rotation-symmetric edge, a ball and a lock pin to limit the ball motion, said pin preferably being linked to the body of the check valve by means of a removable element.

The invention furthermore encompasses a type of design that permits the ball check valves to be metallically tight against the valve body upon installation and that does not require additional sealing materials.

In a further advantageous embodiment of the invention the external shape of the check valves exhibits a cylindrical and a conical section, the latter being accommodated by a matching cone in the valve body when it is assembled. The taper of the two cones is selected such that there is a difference in gradient between the two cones and the said difference does not exceed 2° of angle, preferably ≦1° of angle. This results in a metallic sealing face so that no other materials are needed.

Hence, the external shape of the check valves needs no sophisticated manufacturing processes.

The device according to the invention is now illustrated on the basis of the examples shown in the attached drawings:

FIG. 1 Valve body with two ball check valves and HP pump rod;

FIG. 2 Detail views of the ball check valves in the suction line.

High-pressure, valve 1 shown in FIG. 1 has inlet 2 and discharge bore 3, inlet 2 being connected to cylinder chamber 5 via suction line 4. The said chamber accommodates and guides the piston rod of a HP pump not detailed in the drawing. Moreover, the said cylinder chamber 5 is connected to discharge bore 3 via high-pressure line 6. Suction line 3 and high-pressure line 6 are equipped with one ball check valve each of Nos. 7 and 8 that are essentially of the same design.

As shown in FIG. 1, ball check valves 7 and 8 are arranged in the suction and high-pressure lines in such a manner that there are no deflective sections, except for the flow around the valve ball.

Figure 2A:
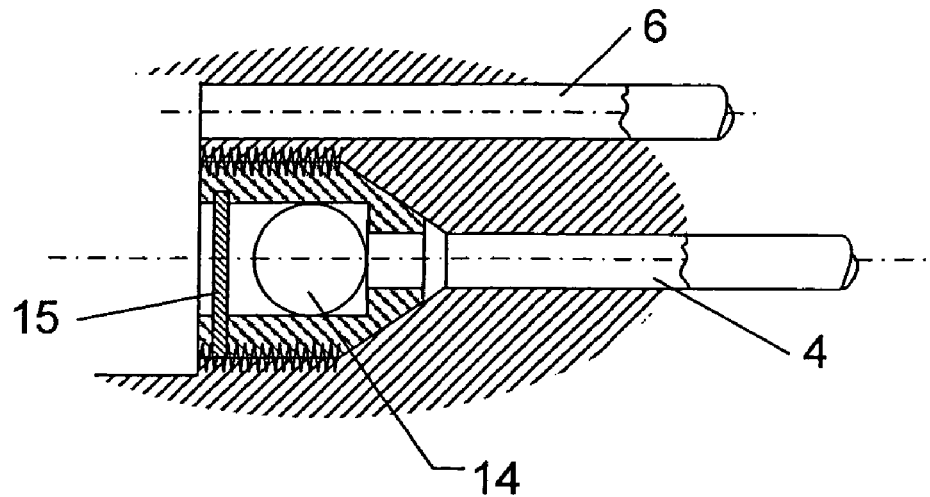
Figure 2B:
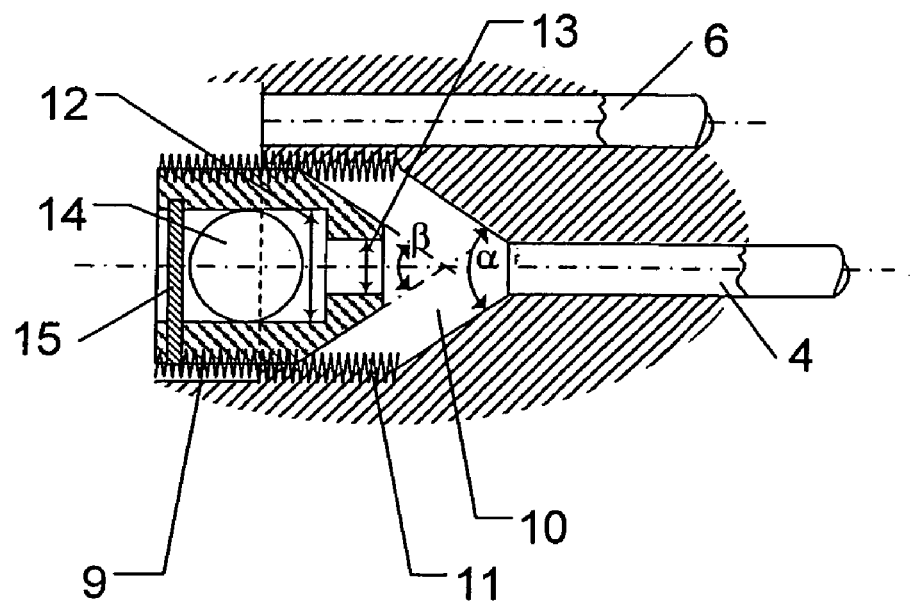

Detail drawings FIG. 2a and FIG. 2b illustrate that ball check valve 7 consists of a rotation-symmetric valve body that has a cylindrical and a conical part. FIG. 2b shows male threading 9 of the cylindrical part, the matching female thread 11 being located on the internal side of recess 10. FIG. 2b further illustrates the size of angle β of the conical part of ball check valve 7 and the size of angle α located towards the suction line. The two conical faces are metalically sealed upon assembly because the depicted example reveals that α is approx. 1° smaller than β.

According to FIG. 2 ball check valve 7 is provided with an axial through-bore which has a diameter 13 adapted to the ball diameter and essentially located in the cylindrical section of the valve body and which also has a diameter 14 essentially adapted to the suction line but smaller than the ball diameter. Ball 15 is positioned in the bore section of diameter 13, the motion of ball 15 towards the suction line being limited by the neck edge formed on valve seat 6 and towards cylinder chamber 4 by means of a removable lock pin 17.

Ball check valve 8 of high-pressure line 6 is of an analogue design and not specifically depicted in detail, ball check valve 8 being arranged in the valve body in such a manner that it opens when ball check valve 7 closes through the action performed by the plunger and vice versa.

The invention claimed is:

1. High-pressure valve for a high-pressure pump, with a valve body having an inlet and outlet, the said valve being connected to the cylinder chamber of a pump piston rod, the inlet being connected to the said cylinder chamber via a bore accommodating a first valve seat and its ball and the said chamber communicating with the outlet via another bore that is also equipped with a valve seat and its ball, the said valve seats and the balls constituting an assembly as ball check valve and being removable from the valve body, wherein the valve seats are configured to form a sealed unit with the valve body, wherein the seal comprises metal on metal, and wherein the valve seats have a cylindrical and conical part, the seats being conically tapered on the metallically sealed side and the bores accommodating valve seats in the valve body also being provided with a conical and cylindrical section, the difference in gradient between the cones amounting to max. 2 (two) degrees of angle and in an ideal embodiment less than 1 (one) degree of angle.

2. Device according to claim 1, wherein neither an additional metallic nor a non-metallic sealing element is arranged in the transitional section between the conical end of the valve seat and the valve body.

3. Device according to claim 1, wherein at least one section of the cylindrical part of the valve body is provided with a male thread and the bore in the valve body has the corresponding female thread in this section.

4. A high-pressure valve for a high-pressure pump, with a valve body having an inlet and outlet, the said valve being connected to the cylinder chamber of a pump piston rod, the inlet being connected to the said cylinder chamber via a bore accommodating a first valve seat and its ball and the said chamber communicating with the outlet via another bore that is also equipped with a valve seat and its ball, the said valve seats and the balls constituting an assembly as ball check valve and being removable from the valve body, wherein:

the valve seats form a metallically sealed unit with the valve body; and the valve seats have a cylindrical and conical part, the seats being conically tapered on the metallically sealed side and the bores accommodating valve seats in the valve body also being provided with a conical and cylindrical section, the difference in gradient between the cones amounting to max. 2 (two) degrees of angle.

5. Device according to claim 4, wherein neither an additional metallic nor a non-metallic sealing element is arranged in the transitional section between the conical end of the valve seat and the valve body.

6. Device according to claim 4, wherein at least one section of the cylindrical part of the valve body is provided with a male thread and the bore in the valve body has the corresponding female thread in this section.

7. High-pressure valve for a high-pressure pump, with a valve body having an inlet and outlet, said valve being connected to the cylinder chamber of a pump piston rod, the inlet being connected to said cylinder chamber via a bore accommodating a first valve seat and its ball and said chamber communicating with the outlet via another bore that is also equipped with a valve seat and its ball, said valve seats and the balls constituting an assembly as ball check valve and being removable from the valve body, wherein the valve seats form a sealed unit with the valve body wherein the valve seats and the valve body consist of metal, and wherein the valve seats have a cylindrical and conical part, the seats being conically tapered on the metallically sealed side and the bores accommodating valve seats in the valve body also being provided with a conical and cylindrical section, the difference in gradient between the cones amounting to max. 2 (two) degrees of angle and in an ideal embodiment less than 1 (one) degree of angle.

8. Device according to claim 7, wherein neither an additional metallic nor a non-metallic sealing element is arranged in the transitional section between the conical end of the valve seat and the valve body.

9. Device according to claim 7, wherein at least one section of the cylindrical part of the valve body is provided with a male thread and the bore in the valve body has the corresponding female thread in this section.

* * * * *